United States Patent
Alford

(10) Patent No.: US 7,137,428 B1
(45) Date of Patent: Nov. 21, 2006

(54) CAR SCREEN AND WINDOW

(76) Inventor: Perry Alford, 245 S. 15th Ave., Maywood, IL (US) 60153

( * ) Notice: Subject to any disclaimer, the term of this patent is extended or adjusted under 35 U.S.C. 154(b) by 0 days.

(21) Appl. No.: 10/936,572

(22) Filed: Sep. 9, 2004

(51) Int. Cl.
*B60J 1/17* (2006.01)
(52) U.S. Cl. .................................. 160/105; 160/370.21
(58) Field of Classification Search ................ 160/37, 160/105, 370.21, DIG. 2; 296/97.2, 97.3, 296/152
See application file for complete search history.

(56) References Cited

U.S. PATENT DOCUMENTS

| | | | | |
|---|---|---|---|---|
| 1,616,297 A | * | 2/1927 | Alber | 160/89 |
| 2,016,645 A | * | 10/1935 | Maddox | 160/103 |
| 2,491,574 A | | 12/1949 | Morgan | |
| 2,779,406 A | | 1/1957 | Merewether | |
| 2,780,458 A | * | 2/1957 | Thaxton | 49/63 |
| 2,805,712 A | | 9/1957 | McVicker | |
| 2,869,634 A | * | 1/1959 | Bourgoin | 160/40 |
| 2,873,800 A | * | 2/1959 | Kogan | 160/180 |
| 3,126,052 A | * | 3/1964 | Tonnon | 160/90 |
| 3,691,686 A | * | 9/1972 | Donegan | 49/56 |
| 4,057,094 A | * | 11/1977 | Smith | 160/37 |
| 4,335,773 A | * | 6/1982 | Masi | 160/23.1 |
| 4,749,222 A | * | 6/1988 | Idland | 296/152 |
| 4,773,697 A | * | 9/1988 | Svensson | 296/152 |
| 4,815,515 A | * | 3/1989 | Lee | 160/23.1 |
| 4,913,212 A | * | 4/1990 | Clavier | 160/105 |
| 5,570,542 A | | 11/1996 | Cameron | |

* cited by examiner

*Primary Examiner*—David Purol
(74) *Attorney, Agent, or Firm*—Patent & Trademark Services, Inc.; Joseph H. McGlynn

(57) ABSTRACT

A ventilation device for automobiles having a screen which fits into the grooved portion of an automobile window opening so it can be moved adjustably up and down within the door. The screen is made from two layers, one of which has circular apertures and the other has openings made from horizontal and vertical members.

8 Claims, 2 Drawing Sheets

CAR SCREEN AND WINDOW

BACKGROUND OF THE INVENTION

The present invention relates generally to screen ventilation devices for automobiles, and particularly to a screen with an improved mesh configuration, adjustably mounted in the window frame of a car door.

DESCRIPTION OF THE PRIOR ART

Various screen devices for automobiles have been proposed. U.S. Pat. No. 2,491,574 to Morgan discloses a screen for a car window that attaches to and moves with the window.

U.S. Pat. No. 2,779,406 to Merewether discloses a screen for an automobile which is adjustable for different window sizes.

U.S. Pat. No. 23,805,712 to McVicker discloses a screen for an automobile which attaches by clips in the window frame.

U.S. Pat. No. 5,570,542 to Cameron discloses a screen for an automobile made up of a plurality of apertures.

All of the prior art patents disclose screens which are separately attached to the window openings of cars, to allow for circulation of fresh air while at the same time preventing the influx of bugs and debris.

The obvious shortcoming of the prior art devices, however, is that they require cumbersome attachment and removal of the screens, making them inconvenient and time consuming to install or remove. Moreover, the prior art screens do not provide protection from the sun. There remains a need for a car screen that allows passengers to raise and lower the screen quickly and easily in the window opening, as well as for a car screen that provides protection from solar heat and glare.

SUMMARY OF THE INVENTION

The present invention discloses an improved car screen, adjustably mounted within the grooved window frame of a car door. The screen consists of a durable weave of vinyl-coated fiber yarn. The mesh is surrounded at its outer edge by a rigid frame of lightweight aluminum or comparable material. Unlike conventional wire mesh, this type of screen material provides protection from the heat and glare of the sun. The material also provides enhanced protection from bugs and debris without compromising visibility or ventilation.

This screen is movably mounted within grooves on the window frame of the car door, interiorly to the sliding glass portion of the automobile window. When not in use, the screen resides in the interior portion of the car door, as does the glass window when the same is rolled down. When needed, the screen can be pulled upwards, with its top edge fitting snugly into the upper portion of the grooved window frame. Thus, passengers can quickly access the screen to provide protected ventilation, and can slide the screen down into the door when it is not needed.

It is an object of the present invention to provide an improved screen ventilation device for automobiles.

It is an object of the present invention to provide an improved screen ventilation device for automobiles that does not require separate attachment and removal of the screen.

It is an object of the present invention to provide an improved screen for automobiles that affords protection from the sun as well as from bugs and debris, without compromising visibility and ventilation.

These and other objects and advantages of the present invention will be fully apparent from the following description, when taken in connection with the annexed drawings.

DESCRIPTION OF THE PREFERRED EMBODIMENT

Figure 1:
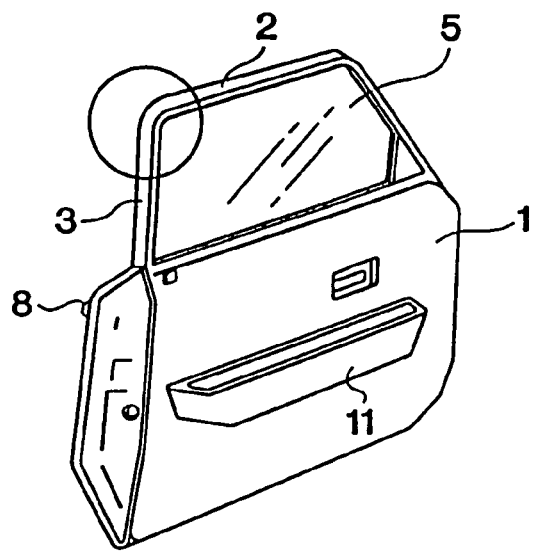
FIG. 1 shows a perspective view of the invention installed in the door of a car.
Figure 2:
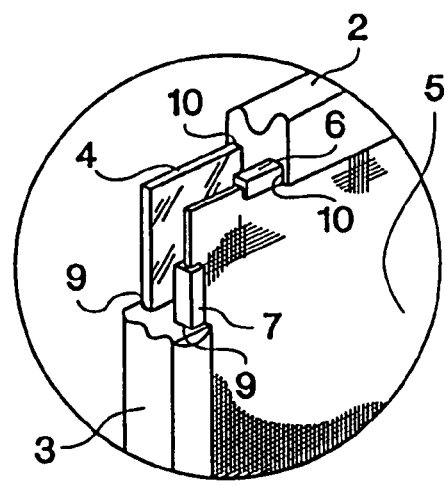
FIG. 2 shows an enlarged, fragmentary view of the invention inside the window frame of a car door, parts being broken away to display the fit of the screen into the grooved frame.

Referring now to the drawings, the invention is shown in FIG. 1 installed in the window frame of the car door 1, having an inner door handle 11, and outer door handle 8, with the screen being in the "up" position. The screen 5 consists of an open weave mesh of durable vinyl-coated fiber yarn. The screen 5 is surrounded at its outer edge by a frame 6, 7 of lightweight aluminum or comparable material (see FIG. 2). The weave of the screen material admits enough light so as not to impair visibility, while at the same time, it blocks heat and glare. The unique construction of the screen also keeps out the tiniest of insects and debris particles while still providing excellent ventilation. The screen with its accompanying frame is mounted in grooves 9 (only one of which is shown in FIG. 2) in the front and rear portions of the car door 1. The car door also has a groove 10 in the top frame 2 that forms the window opening. When the window is in the "up" position, the top of the screen will fit into the groove 10. This will add stability to the screen if the car is moving, as well as block the sun so it will not interfere with the driver's vision.

The fabric is a specially woven solar screen material that blocks up to 70% of the sun's heat and glare. The frame material should be a durable metal frame such as, but not limited to, aluminum in order to withstand the pressures of the wind while the car is moving. Also, the frame of the screen will not contact the window, but will be spaced about ¼ of an inch away to prevent damage to the window.

As shown in FIG. 2, the window opening of the car door contains concave grooved portions 9, 10, into which the outer edge of the glass window 4 and the screen frame are inserted. The frame of the screen slides within the interior grooved portions 9, allowing the screen to be moved adjustably up and down within the door, as depicted by the dotted lines in FIGS. 3, 4, and 5. This eliminates the need to remove the screen (when it is not in use) or to fit it separately onto the car, as is the case with prior art car screens. When not in use, the screen slides down into the interior of the door, in the same way as the glass portion of the car window. The screen can be held in a partially open or closed position by the friction between the frame of the screen 5 and the interior of grooves 9.

Figure 3:
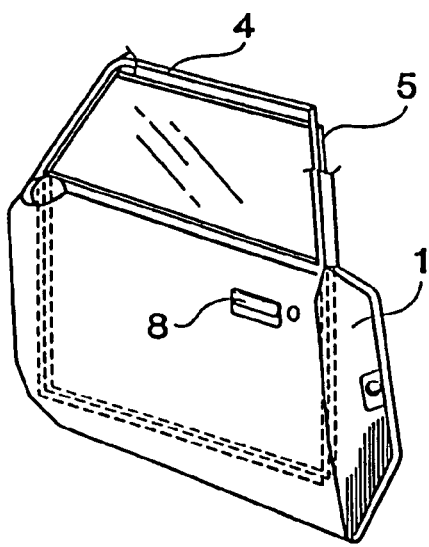
FIG. 3 shows a perspective view of the invention from the outside of the car door, the top portion of the window frame being omitted for clarity, with shadow lines representing the position of the screen and window in the down position.
Figure 5:
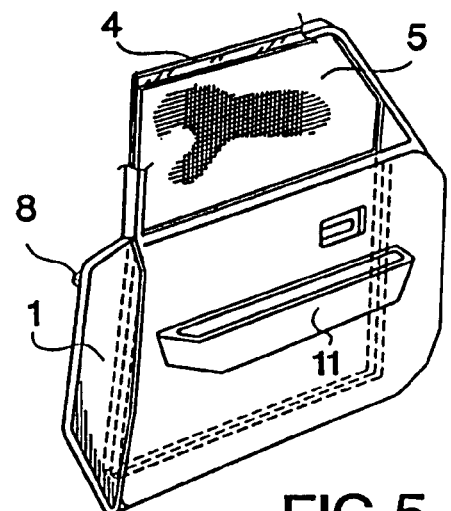
FIG. 5 shows a fragmentary, perspective view of the interior of a car door with the invention installed therein, with the top of the window frame omitted for clarity and shadow lines representing the position of the window and screen in the down position.
Figure 4:
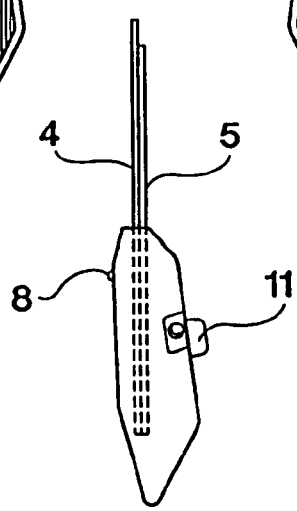
FIG. 4 shows the invention as seen from back, side edge of the door, again with shadow lines representing the position of the window and screen in the down position, and with the top portion of the window frame omitted for clarity.

Also, it should be noted that the views shown in FIGS. 3, 4, and 5 are with the screen frame removed for clarity. In addition the thickness of the window and the screen are exaggerated for clarity.

Figure 6:
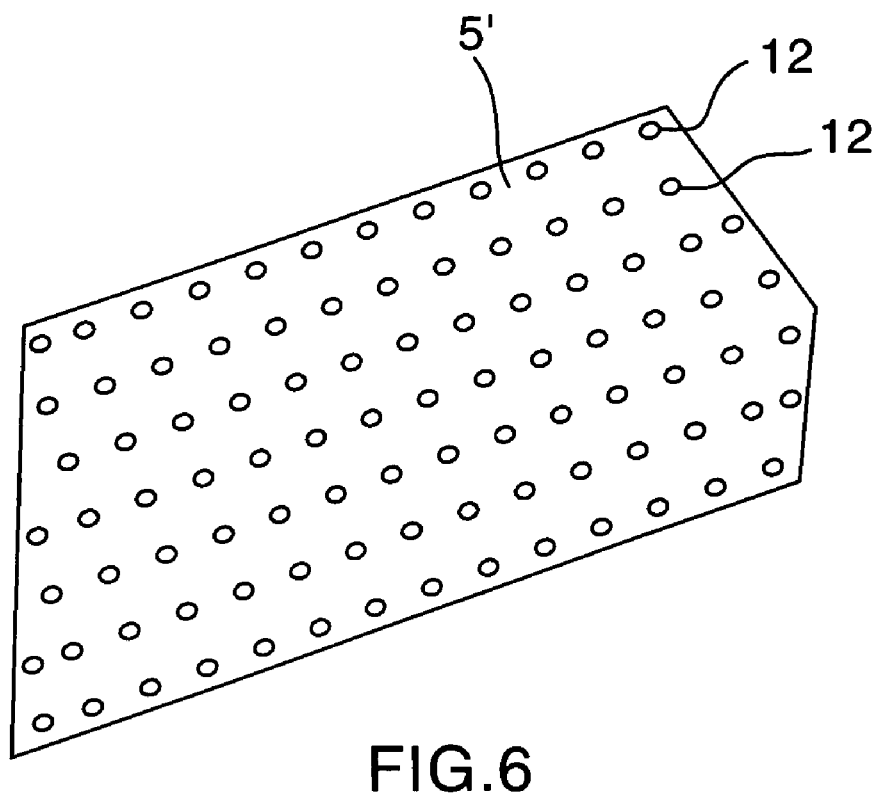
FIG. 6 shows a modified form of screen used with the present invention.

The modified form of the screen 5', shown in FIG. 6, can be used in place of the screen 5 shown in FIGS. 2 and 5. The screen 5' shown in FIG. 6 has a plurality of small apertures 12 which will perform the same function as the screening in the FIG. 2 screen, i.e. the apertures 12 will allow air to pass through, but will keep out bugs and some sunlight. When not in use, the screen 5' slides down into the interior of the door, in the same way as the glass portion of the car window. The screen can be held in a partially open or closed position by the friction between the frame of the screen 5' and the interior of grooves 9.

Figure 7:
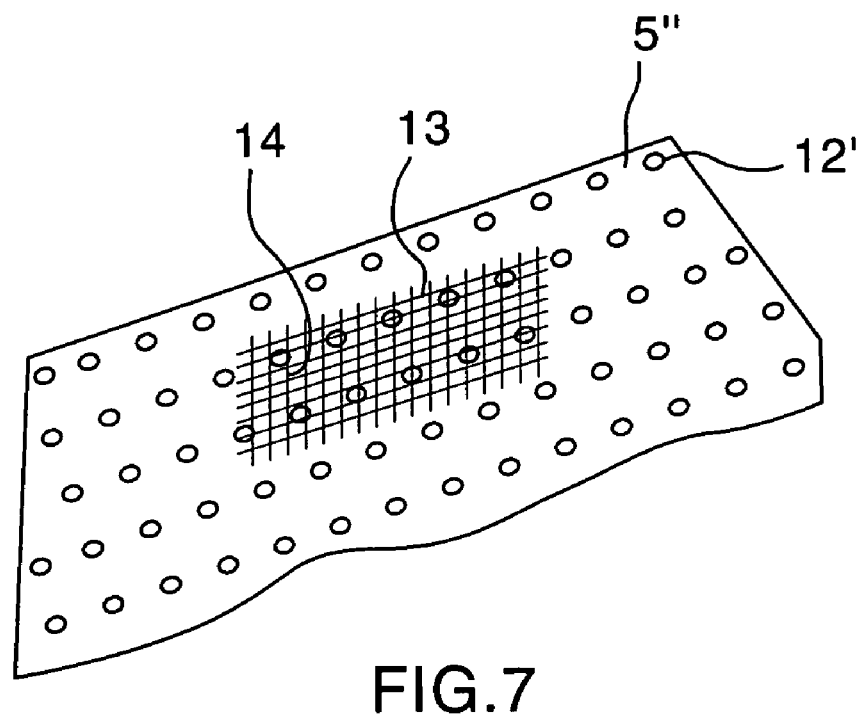
FIG. 7 shows a another modified form of screen used with the present invention.

The modified screen 5", shown in FIG. 7, has a plurality layers of material. The first layer is composed of small apertures 12', which are similar to the apertures 12 in the FIG. 6 device. In addition, the screen in FIG. 7 has a second layer composed of linear elements composed of vertical wires 14 and horizontal wires 13 which form a screen similar to the FIG. 2 device. The second layer is superimposed over the second layer. The wires 13, 14 can be made from any type of material commonly used for screens. In addition, the wires 13, 14 can be a separate piece which is placed over the screen with the apertures 12', or the wires can be adhered to the screen with the apertures 12'. By using the wires 13, 14, in addition to the apertures 12', the size of the apertures can be increased to allow more air to enter, and bugs or insects will still not be able to enter through the combination screen. It should be noted that the wires 13, 14 as shown in FIG. 7 are only shown partially covering the screen with the apertures 12', however, this is only for illustration purposes to clearly show the apertures 12'. In actual use the wires 13, 14 will cover the entire area with the apertures 12'.

The dimensions of the screen frame obviously must vary to accommodate different models of automobiles. Whatever the dimensions, however, the screen should be designed to slide easily within the grooves of the window opening. Various means could be employed to keep the window in place when it is in the up position. Metal snaps or hook and loop fasteners, for example, would provide a convenient means to secure the screen in place for use, or the user could rely on the friction referred to above.

Although the car window screen and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

I claim:

1. A screen for a vehicle window in combination with an automobile door frame comprising:
   a door frame for an automobile window,
   said door frame having at least one concave channel running vertically in said door frame,
   a screen frame slidably engagable in said channel,
   a mesh material secured within said screen frame,
   said mesh material having a first layer of material and a second layer of material,
   said screen frame being movable from a first position to a second position, and
   said screen, when in said second position, being completely positioned within a door of an automobile and out of sight,
   whereby said screen frame may be moved up or down in said channel and said mesh material will act as a barrier to the sun's glare and insects, and
   wherein said door frame has a top portion and at least one side portion,
   each of said top and side portions having a plurality of grooves, and
   said screen frame has a top portion and at least one side portion,
   said top portion of said screen frame is engaged in one of said plurality of grooves.

2. The screen for an automobile window as claimed in claim 1, wherein said first layer of material comprises material having a plurality of circular apertures in said material.

3. The screen for an automobile window as claimed in claim 1, wherein said second layer of material is composed of a plurality of linear elements.

4. The screen for an automobile window as claimed in claim 3, wherein some of said linear elements are arranged vertically and some of said linear elements are arranged horizontally.

5. The screen for an automobile window as claimed in claim 1, wherein said second layer is made from vinyl-coated fiber yarn having an open weave.

6. The screen for an automobile window as claimed in claim 1, wherein said first layer of material comprises material having a plurality of circular apertures in said material, and
   wherein said second layer of material is composed of a plurality of linear elements.

7. The screen for an automobile window as claimed in claim 1, wherein said first layer of material comprises material having a plurality of circular apertures in said material, and
   wherein said second layer of material is composed of a plurality of linear elements, and
   wherein some of said linear elements are arranged vertically and some of said linear elements are arranged horizontally.

8. The screen for an automobile window as claimed in claim 1, wherein said at least one side portion of said screen frame is engaged in another of said plurality of grooves.

* * * * *